(12) United States Patent
Sjoblom et al.

(10) Patent No.: US 6,637,705 B2
(45) Date of Patent: Oct. 28, 2003

(54) FLOW METER STRUT

(75) Inventors: Byron G. Sjoblom, Middletown, RI (US); Gary R. Berlam, Cambridge, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/051,520

(22) Filed: Jan. 22, 2002

(65) Prior Publication Data

US 2003/0136883 A1 Jul. 24, 2003

(51) Int. Cl.⁷ .................................................. F16L 3/22
(52) U.S. Cl. ........................ 248/68.1; 248/49; 248/127; 248/161
(58) Field of Search .................. 248/68.1, 49, 127, 248/146, 161, 172, 176.3, 122.1, 125.1, 125.2, 343, 906, 200.1; 211/857; 73/201, 272 R, 273, 195

(56) References Cited

U.S. PATENT DOCUMENTS

| | | | | |
|---|---|---|---|---|
| 2,322,753 A | * | 6/1943 | Thomas | 128/221 |
| 3,770,031 A | * | 11/1973 | Olson | 144/136 |
| 4,061,298 A | * | 12/1977 | Kober | 278/677 |
| 4,154,100 A | * | 5/1979 | Harbaugh et al. | 73/861.66 |
| 4,237,739 A | * | 12/1980 | Owen et al. | 73/861.63 |
| D278,316 S | | 4/1985 | Bengtson | D10/96 |
| 4,552,270 A | * | 11/1985 | Lentz et al. | 211/17 |
| 4,637,175 A | * | 1/1987 | Froening et al. | 52/27 |
| 4,696,194 A | * | 9/1987 | Taylor | 73/861.66 |
| 4,723,747 A | * | 2/1988 | Karp | 248/298 |
| 4,813,550 A | * | 3/1989 | Saeks | 211/17 |
| 4,972,339 A | * | 11/1990 | Gabrius | 362/366 |
| 4,995,288 A | * | 2/1991 | DellaPolla | 83/574 |
| 5,086,930 A | * | 2/1992 | Saeks | 211/17 |
| 5,337,615 A | * | 8/1994 | Goss | 73/861.33 |
| 5,386,959 A | * | 2/1995 | Laughlin | 248/205.1 |
| 5,394,781 A | * | 3/1995 | Tsubai | 83/449 |
| D358,952 S | * | 6/1995 | Stein | D6/466 |
| 5,996,945 A | * | 12/1999 | Coles et al. | 248/68.1 |
| 6,012,340 A | * | 1/2000 | Pounder | 73/861.77 |
| 6,033,098 A | * | 3/2000 | Hentz | 362/430 |
| 6,206,613 B1 | * | 3/2001 | Elkins | 405/157 |
| 6,389,909 B1 | * | 5/2002 | Johnson et al. | 73/861.78 |
| 6,401,555 B1 | * | 6/2002 | Bowers | 73/866.5 |
| 6,422,092 B1 | * | 7/2002 | Morrison et al. | 73/861.04 |
| D464,582 S | * | 10/2002 | Pepperling et al. | D10/96 |

OTHER PUBLICATIONS

U.S. Ser. No. 2002/0144557 to Drahm Electromechanical Transducer, Oct. 2002.*

* cited by examiner

*Primary Examiner*—Korie Chan
*Assistant Examiner*—Amy J. Sterling
(74) *Attorney, Agent, or Firm*—James M. Kasischke; Michael F. Oglo; Jean-Paul A. Nasser

(57) ABSTRACT

A flow meter strut assembly includes a strut portion having a first end plate, a second end plate, a longitudinally adjustable flow meter support structure between the first and second end plates, and curved mounting surfaces formed on outer surfaces of each of the first and second end plates of the strut portion. At least one flow meter is adjustably mounted on the flow meter support structure. The flow meter support structure is adjustable longitudinally by a turnbuckle assembly connected between the flow meter support structure and the second end plate.

6 Claims, 1 Drawing Sheet

FLOW METER STRUT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention generally relates to a flow meter strut.

More particularly, the invention relates to a flow meter strut having multiple flow meters mounted at different vertical locations on the strut.

(2) Description of the Prior Art

Currently with large piping systems, such as submarine launcher systems, it is difficult to measure velocity profiles and the corresponding volumetric flow rates during water slug firings due to the difficulty in modifying the ship board hardware to fix existing flow meter designs. Mounting a series of existing flow/velocity meters within the existing piping systems without modifying high pressure boundaries will greatly simplify the work required to get actual shipboard measurements. To date, only velocity and flow measurements made in controlled shore based facilities have been attainable using instruments that mount on the external surface of the pipes. This instrument will allow for shipboard measurement of the transient velocity and flow distributions within the torpedo tube launching system. Thus, a problem exists in the art whereby it is necessary to mount plural flow meters within a piping system without altering the piping system and enabling the use of known flow meters, particularly in a shipboard environment.

The following patents, for example, disclose various types of flow meters and their insertion into pipes, but do not disclose a flow meter strut assembly as described by the present invention.

U.S. Pat. No. 2,714,819 to Clark;

U.S. Pat. No. 3,748,901 to DeBaun;

U.S. Pat. No. 3,751,982 to Lambert;

U.S. Pat. No. 3,981,193 to Goulet;

U.S. Pat. No. 4,154,100 to Harbaugh et al.;

U.S. Pat. No. 4,562,745 to Parra;

U.S. Pat. No. 4,696,194 to Taylor;

U.S. Pat. No. 5,817,950 to Wiklund et al.;

U.S. Pat. No. 6,012,340 to Pounder et al.; and

U.S. Pat. No. 6,109,116 to Pelczynski.

Specifically, Clark discloses a fluid velocity measuring instrument having a plurality of means positioned in the path of fluid flow each adapted to transmit pressure as a function of the velocity of fluid flow thereat; means for averaging the velocity of the flow comprising a plurality of containers having liquid therein at a common liquid level, with each of the containers being connected to a different one of the pressures and thereby to displace liquid from the containers, with each container being shaped to cause the displacement of liquid therefrom in volumes which are a power of the pressures transmitted thereto; a receptacle in liquid communication with each of the containers to receive liquid in a volume equal to the total amount of liquid so displaced; means for vertically adjusting the receptacle; and indexing means associated with the receptacle and the containers to provide a reference for adjusting the receptacle to equalize the level of the liquid in the containers and the receptacle before and in the receptacle after liquid is displaced from the containers by the pressure.

The patent to DeBaun discloses an air balancing hood for collecting air discharged to the atmosphere from air diffusers, grilles, etc., such as those used in typical heating, ventilation and air-conditioning systems, in a convergent collection chamber which terminates in an air-straightening neck of known cross-section to eliminate turbulence and thereby achieve substantially laminar air flow for delivery to flow measuring instrumentation. The volume of air passing through the diffuser is directly measured by total pressure measuring means assembled to the hood and calibrated in flow rate units.

Lambert discloses a fluid flow meter head for installation in a duct to measure the fluid flow therein and thereafter to control the fluid flow rate therein, and includes an elongated hollow tubular member mounted in the flow of fluid in the duct, the member having spaced walls extending rearwardly therefrom to create a low pressure space therebetween, a central wall therein dividing the hollow member into two separate chambers, a series of axially spaced openings in the member facing the flow of fluid and opening into one of the chambers to provide a total pressure sensing chamber, a series of spaced openings in the member facing across the flow of fluid and opening to the second chamber to provide a static pressure sensing chamber, and fluid connecting means from each chamber to a means for measuring differential pressure to provide an indication for the air flow and to control the air flow rate.

Goulet discloses an apparatus for permanent installation in a heating or air conditioning duct to sense total and static pressure of air flowing therethrough. Plural manifolds are arranged within the duct to sense total pressure at a number of selected locations in a transverse plane of the duct. The plurality of manifolds communicates with a connecting manifold either directly or through sensing tubes arranged axially within the manifold tubes. Static pressure is also sensed at a plurality of preselected locations in the duct and communicated to at least one additional manifold tube arranged within the duct. Total and static pressure are communicated through single openings in the duct wall for attachment exteriorly thereof to an appropriate measuring instrument.

The patent to Harbaugh et al. discloses a method for stabilizing the pressure sensed by the downstream-facing port of a pitot tube type flow meter over a broad flow range, thereby providing a stable and repeatable flow coefficient. The invention comprises localizing the areas of boundary layer separation across deflecting surfaces located upstream of the port by sharply contouring the edges thereof and directing the flowing stream there across, and preventing reattachment of the boundary layer by positioning and contouring the surfaces containing the port downstream of the sharply contoured edges so as to continuously lie within the wake of the fluid flowing around the latter over a broad range of flow rates. The invention also encompasses the improved averaging pitot-type flow meter characterized by flow deflecting means having sharply contoured edges on both sides thereof effective to fix the location at which boundary layer separation occurs over a broad range of laminar and turbulent flow conditions, an upstream-facing impact surface shaped to direct the flowing fluid across the sharply contoured edges, and a downstream pressure so contoured and positioned relative to the sharply contoured edges as to cooperate there within preventing reattachment of the boundary layer under varying flow conditions.

Parra discloses a flow meter for insertion in a fluid conduit, the flow meter comprising a tubular member for the passage there through of a fluid which flows through the conduit and whose flow rate is to be measured; a bluff body which is mounted in the tubular member so as to produce in the fluid oscillations whose frequency varies with the flow rate; sensor means responsive to the fluid oscillations for indicating the flow rate, and vortex reducing means for reducing the separation of vortices from the tubular external surface of the tubular member.

The patent to Taylor discloses a sensing probe for use in determining fluid flow rates along a duct and comprises a probe pipe mounted within a wall of the duct to extend there across. Plural total pressure orifices are provided through the probe wall, to face fluid flow, and a single static pressure opening is provided on the downstream side of the probe. An averaging tube is mounted within the pipe and has two openings suitably disposed with respect to the duct axis so that the pressure within the averaging tube closely approximates to the average total pressure of the flow rate determination. The static pressure orifice communicates with a further tube within the pipe, to allow sensing of a pressure directly related to the actual static pressure.

Wiklund et al. discloses a transmitter in a process control system for measuring flow rate. The transmitter measures total pressure and differential pressure of process fluid flowing through a process pipe. The static pressure is determined based upon the total pressure. The calculated static pressure is used to determine the fluid density and the gas expansion factor of the process fluid flowing in the pipe. This information is used to calculate flow rate of the process fluid.

Pounder discloses an insertion-type fluid flow meter for measuring the flow rate of a fluid flowing through a conduit, wherein the flow meter incorporates a strut-mounted rotor having just one or two blades such that it can rotate through a circular area of diameter substantially larger than the maximum dimension of an opening in the conduit wall through which the strut extends. This minimizes the size of the opening, which simplifies its sealing. In addition, the support and the strut are configured such that the strut is releasably secured to the support by a snap fit, to facilitate a convenient replacement of the strut and attached rotor as the need might arise. The flow meter further incorporates a special set of ring-shaped spacers, to facilitate a convenient adjustment of the distance by which the strut projects into the conduit.

Pelczynski discloses a method and apparatus for use in installing a thorough-the-wall sensing device in a laboratory fume hood. The apparatus includes a sample tube with an outlet and a plurality of apertures and the tube is interconnected to an anemometer. The method includes placing the outlet in a number of positions inside of the fume hood to simulate a sidewall adapter for a through-the-wall sensing device in order to locate an optimum position for a through-the-wall sensing device. The method also includes fixing the sample tube in a number of positions within the fume hood while variably covering some of the apertures to simulate numerous locations and configurations for an averaging tube used with a through-the-wall sensing device. Therefore, an optimum location and configuration for an averaging tube can be readily determined.

It should be understood that the present invention would in fact enhance the functionality of the above patents by providing a flow meter strut assembly which is entirely housed within a piping system, is adjustable to fit an inner diameter of any piping system, and incorporates known flow meter instruments.

SUMMARY OF THE INVENTION

Therefore it is an object of this invention to provide a longitudinally adjustable flow meter strut assembly.

Another object of this invention is to provide a longitudinally adjustable flow meter strut assembly and utilize known flow meter instruments therewith.

Still another object of this invention is to provide a longitudinally adjustable flow meter strut assembly in which flow meter instruments are removably mounted on the strut portion of the flow meter strut assembly.

A still further object of the invention is to provide a flow meter strut assembly universally applicable to a variety of flow situations.

Yet another object of this invention is to provide a flow meter strut assembly having a fully internal mountable flow meter instrument.

In accordance with one aspect of this invention, there is provided a flow meter strut assembly including a strut portion having a first end plate, a second end plate, a longitudinally adjustable flow meter support structure between the first and second end plates, and curved mounting surfaces formed on outer surfaces of each of the first and second end plates of the strut portion. At least one flow meter is adjustably mounted on the flow meter support structure. The flow meter support structure is adjustable longitudinally by a turnbuckle assembly connected between the flow meter support structure and the second end plate.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
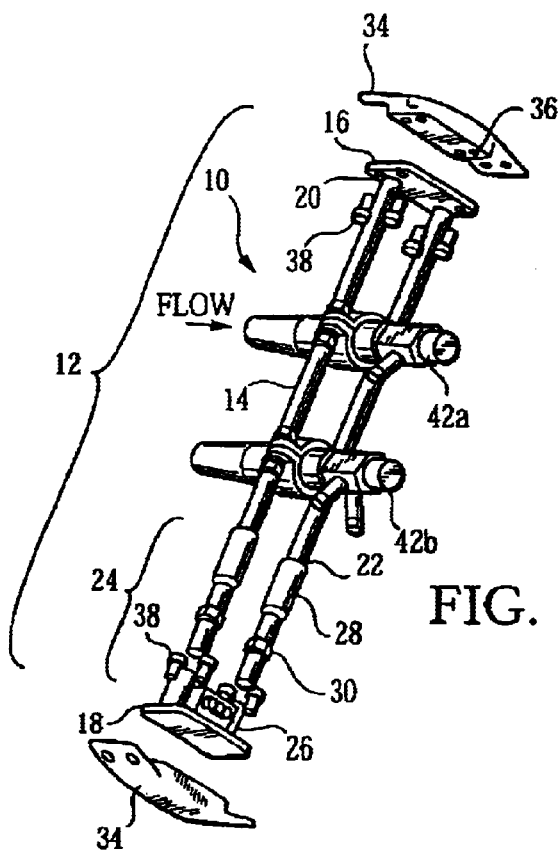
FIG. 1 is an exploded perspective view of a flow meter assembly according to a preferred embodiment of the present invention.
Figure 1A:
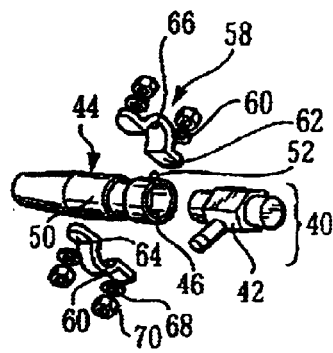
FIG. 1A is an exploded perspective view of a single flow meter and clamp assembly according to a preferred embodiment of the present invention.
Figure 2:
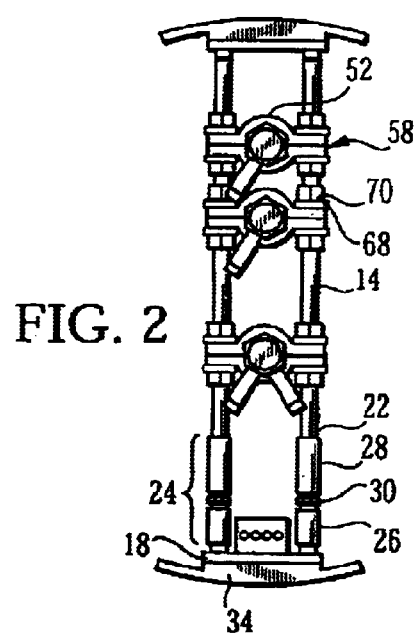
FIG. 2 is a top view of the flow meter assembly of the present invention.
Figure 3:
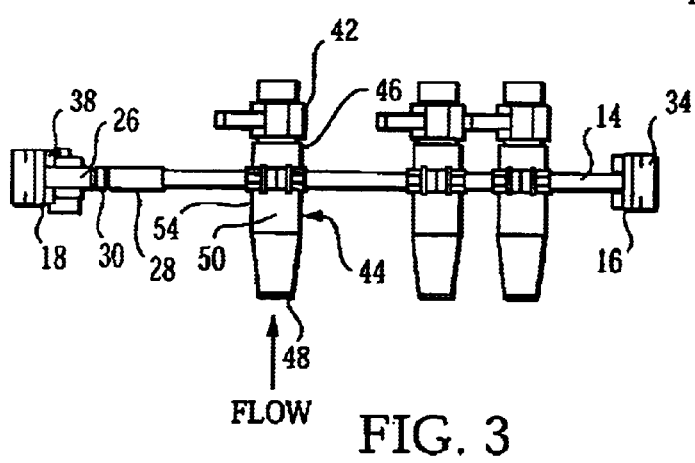
FIG. 3 is a side view of the flow meter assembly of the present invention.

In general, the present invention is directed to a flow meter assembly 10 as shown in FIGS. 1–3 with FIG. 1 being an exploded perspective view, FIG. 1A being an exploded perspective view of the flow meter and clamp assembly, FIG. 2 being a top view, and FIG. 3 being a side view. The explanation following of the invention will collectively refer to all of the drawings as necessary.

The flow meter assembly 10 builds upon a strut assembly 12 having a pair of parallel flow meter shafts 14 fit between a fixed end plate 16 and an adjustable end plate 18. The flow meter shafts 14 are threaded over at least a central portion thereof and each have a first end 20 secured by welding or the like to the fixed end plate 16. A second end 22 of each flow meter shaft 14 is connected to the adjustable base plate 18 with a turnbuckle assembly 24.

The turnbuckle assembly 24 includes at least one shaft base nut 26 welded or otherwise securely fixed to the adjustable end plate 18 and aligned with corresponding ones of the flow meter shafts 14. A sh aft nut 28 is threadably secured to the second end 22 of the flow meter shaft 14. A turnbuckle bolt 30 is threaded on both ends with a nut in the center. One threaded end of turnbuckle bolt 30 has a left hand thread and the other has a right hand thread. Bolt 30 is threaded into the shaft base 26 and shaft nut 28. Left hand threaded end is threaded into a correspondingly threaded one of shaft nut 28 and shaft base 26. The turnbuckle bolt 30 is selected from bolts of varying lengths, and is used to adjust the overall length of the flow meter shaft 14. Thus, in order to allow for adjustability in the length of the flow meter shafts 14 to accommodate different pipe inner diameters, the turnbuckle assembly 24 is used on one end of the strut assembly 12.

Once the flow meter shafts 14 are assembled with the respective end plates 16, 18, the end plates are in turn each secured to a curved end plate 34. Curved end plates 34 have apertures 36 formed on an inner surface thereof and is connected to either of the fixed end plate 16 or the adjustable end plate 18 in the same manner, that is with connectors 38 such as screws, caps, socket hex heads or the like. Although four connectors 38 are shown for connecting each end plate 16, 18 to a curved end plate 34, any suitable number of connectors 38 may be used according to a particular circumstance. By adjusting a length of the flow meter shafts 14 and securing the shafts 14 to curved end pieces 34 via the fixed 16 and adjustable 18 end plates, the strut assembly 12 will be easily fit to an inner diameter of a flow pipe (not shown). The curved end pieces 34 would be machined to match whatever mounting locations are available within the piping system.

Turning now, to an explanation of the flow meter assembly 40, any known type of flow meter instrument 42 can be used, including that shown at 42a and 42b, by way of example. The particular flow meter instrument 42 well be selected according to the end use thereof, and virtually any type of flow meter instrument 42 may be mounted to the strut assembly 12 described. A flow guide 44, here shown to be of a substantially cylindrical shape, includes a flow meter port 46 at a first end thereof, a flow entry port 48 at an opposing end thereof, and a body portion 50 between the opposing port ends. The flow meter port 46 is used to support the flow meter instrument 42 in the flow guide 44. The flow of fluid will enter the flow guide 44 at flow entry port 48 and exit the flow guide 44 through the flow meter instrument 42 at the flow meter port 46 end thereof. In order to secure the flow guide 44 in the assembly (described below), a straight headless dowel pin 52 is fixed to an outer surface 54 of the body portion 50 of the flow guide 44.

The flow guides 44 containing the flow meter instrument 42 therein are mounted as follows. A pair of clamp members 58 support each flow guide 44. Each clamp member 58 conforms in shape to the outer surface of the body portion 50 of the flow guide 44. Here, each clamp 58 is formed such that an arcuate portion 60 surrounds the body portion 50 of the flow guide 44, and end flanges 62 each have an aperture 64 therein for sliding over the flow meter shafts 14. Additionally, the arcuate portion 60 of at least one of the clamps 58 includes a dowel aperture 66 therethrough for receiving the dowel pin 52 of the flow guide 44. This prevents the flow guide 44 from sliding out of the assembled clamps 58. The clamps 58 are slid onto the flow meter shafts 44 so as to have a convex portion of the clamp 58 facing the flow guide 44. With the flow guide 44 positioned between a pair of clamps 58, the clamps 58 are secured to each other and the threaded flow meter shafts 14 with washers 68 and nuts 70 as shown.

In this manner, as many individual flow meter instruments 42 as required can be mounted on the flow meter shaft 14.

As should now be understood from the above, the flow meter assembly 10 of the present invention is not a new flow meter design. Instead, the preferred invention utilizes existing off the shelf flow meter instruments 42 seated in a novel flow guide 44, and mounted on a novel strut assembly 12 that allows for adjustment along the flow meter shafts 14 to measure the flow/velocity at the centers of equal areas (common method of measuring flow/velocity rates) within a launch system. These flow meter assemblies 40 are mounted fully in series within a piping system, so all of the flow in the system passes through the flow meter instruments 42. By mounting the flow meter assembly 40 on a strut assembly 12, and adjusting the vertical location of each flow meter instrument 42, it is possible to attain multiple readings across the diameter of a pipe. These readings will be a flow rate through each individual flow meter instrument 42. The flow rate through each meter can then be converted to a velocity at that point in the large pipe. By integrating the velocity at each of the individual flow meter instruments 42, over the cross section of the pipe internal diameter, an overall flow rate can be calculated. As flow passes down a pipe, it accelerates around any obstruction. To avoid measuring the artificially high flow velocity, the flow guide 44 extends off the upstream side of the individual flow meter instruments 42 (~3 diameters of the individual flow meter outer diameter) and defined by entry port 48 to allow sampling upstream of the disturbance caused by the strut assembly 12.

This configuration will provide the capability to measure the velocity distribution and corresponding flow rates within a piping system without having to modify the exterior of the pipe. To date, there are no commercial designs for performing this function. This configuration allows for a fully internally mountable flow meter, without having to cross high-pressure boundaries. With the strut assembly 12 mounted within the piping system (not shown) wiring (not shown) can be run along the length of the pipe, and can be brought out of the system at any convenient point. By using the correct type of flow meter instruments, both transient changes in flow conditions, as well as steady state readings can be taken. This assembly is designed to be easily adjustable to fit varying applications. A strut assembly could be built over a range of pipe sizes, using the inherent adjustability in the turnbuckle assembly. If needed, a flow meter instrument designed to determine flow in both directions could be used.

The concept is not sized for any specific pipe inner diameter. This assembly can be made any size, with as many individual flow meter assemblies as required to determine the velocity distribution within the pipe. The shaft sizes could be changed in order to stiffen or shrink the assembly if needed. If the blockage of the assembly disturbs the flow in the pipe beyond an acceptable level, the assembly could be placed within a wing shaped fairing to lessen flow losses. Various sizes of flow meter instruments may be incorporated into the assembly by changing the size of the flow guide and the top and bottom sliding clamps.

In view of the above detailed description, it is anticipated that the invention herein will have far reaching applications other than those described.

This invention has been disclosed in terms of certain embodiments. It.will be apparent that many modifications can be made to the disclosed apparatus without departing from the invention. Therefore, it is the intent of the appended claims to cover all such variations and modifications as come within the true spirit and scope of this invention.

What is claimed is:

1. A flow meter strut assembly for mounting a flow meter comprising:

a first end plate having a mounting surface formed on an outer surface thereof;

a second end plate having a mounting surface formed on an outer surface thereof;

a flow meter support structure joined between said first end plate and said second end plate, said flow meter support structure being longitudinally adjustable; and a flow meter support bracket slidably positioned on said flow meter support structure, said flow meter support bracket being positionable at varying positions on said flow meter support structure and providing a location for mounting a flow meter thereon;

said flow meter support structure comprising:

at least two flow meter shafts, each flow meter shaft having a first end connected to the first end plate and a second end; and at least one longitudinal adjustment assembly joined to said flow meter shaft second ends and to said second end plate, said longitudinal adjustment assembly being adjustable to various lengths for mounting said flow meter strut in a structure;

said longitudinal adjustment assembly comprising:

a shaft nut fixed on said flow meter shaft second end;

a turnbuckle bolt having a right hand threaded section, a tightening section, and a left hand threaded section with one of said right and left hand threaded sections being threadably joined in said shaft nut; and a threaded shaft base joined to said second end plate, said threaded shaft base being threaded for receiving the other of said right and left hand threaded sections of said turnbuckle bolt.

2. The assembly according to claim 1 wherein said flow meter support bracket comprises:

a flow guide having a flow meter port and a flow entry port, said flow meter port being joinable to said flow meter and said flow entry port being positionable to receive a fluid flow; and a clamp assembly joined to said flow guide and slidably positioned between said at least two flow meter shafts.

3. The assembly according to claim 2 wherein said clamp assembly comprises:

a first half bracket having flat end portions at either end and an arcuate center portion conforming with the flow guide, said flat end portions each having a shaft aperture extending therethrough;

a second half bracket having flat end portions at either end and an arcuate center portion conforming with the flow guide, said flat end portions each having a shaft aperture extending therethrough; and a bracket fastener joining said first half bracket to said second half bracket and to each said shaft extending through said shaft apertures, said flow guide being held between said first half bracket and said second half bracket at said arcuate center portions.

4. The assembly according to claim 3 wherein:

said flow guide has a pin extending therefrom; and said first half bracket has a pin aperture formed in said arcuate center portion, said flow guide pin extending through said pin aperture and preventing said flow guide from sliding through said first half bracket and said second half bracket.

5. A flow meter strut assembly for mounting a flow meter comprising:

a first end plate having a mounting surface formed on an outer surface thereof;

a second end plate having a mounting surface formed on an outer surface thereof;

at least two flow meter shafts, each flow meter shaft having a first end connected to the first end plate and a second end;

a shaft nut fixed on each said flow meter shaft second end;

a turnbuckle bolt for each flow meter shaft having a right hand threaded section, a tightening section, and a left hand threaded section with one of said right and left hand threaded sections being threadably Joined in said shaft nut;

a threaded shaft base for each flow meter shaft joined to said second end plate, said threaded shaft base being threaded for receiving the other of said right and left hand threaded sections of said turnbuckle bolt; and a flow meter support bracket slidably positioned on said flow meter shafts, said flow meter support bracket being positionable at varying positions on said flow meter shafts and providing a location for mounting a flow meter thereon.

6. The assembly according to claim 5 wherein said flow meter support bracket comprises:

a flow guide having a flow meter port and a flow entry port, said flow meter port being joinable to said flow meter and said flow entry port being positionable to, receive a fluid flow, said flow guide transferring said received fluid flow to said flow meter port;

a first half bracket having flat end portions at either end and an arcuate center portion conforming with the flow guide, said flat end portions each having a shaft aperture extending therethrough;

a second half bracket having flat end portions at either end and an arcuate center portion conforming with the flow guide, said flat end portions each having a shaft aperture extending therethrough; and a bracket fastener joining said first half bracket to said second half bracket and to each said shaft extending through said shaft apertures, said flow guide being held between said first half bracket and said second half bracket at said arcuate center portions.

* * * * *